(12) United States Patent
Kahrs et al.

(10) Patent No.: US 7,240,913 B2
(45) Date of Patent: Jul. 10, 2007

(54) SLIDING LATCH FOR FIFTH WHEEL HITCH

(75) Inventors: Donald H. Kahrs, Valley Springs, CA (US); Don F. Linger, Stockton, CA (US)

(73) Assignee: Valley Industries, L.L.C., Lodi, CA (US)

( * ) Notice: Subject to any disclaimer, the term of this patent is extended or adjusted under 35 U.S.C. 154(b) by 0 days.

(21) Appl. No.: 11/098,978

(22) Filed: Apr. 5, 2005

(65) Prior Publication Data

US 2006/0220344 A1   Oct. 5, 2006

(51) Int. Cl.
*B62D 53/06* (2006.01)
*B62D 53/08* (2006.01)

(52) U.S. Cl. .................. 280/433; 403/349; 403/348

(58) Field of Classification Search ............. 280/433; 403/349, 348
See application file for complete search history.

(56) References Cited

U.S. PATENT DOCUMENTS

| | | | |
|---|---|---|---|
| 4,592,566 A * | 6/1986 | Inoue et al. ................. 280/433 |
| 4,721,323 A * | 1/1988 | Czuk et al. .................. 280/433 |
| 5,257,796 A | 11/1993 | Thorwall et al. | |
| 5,516,137 A | 5/1996 | Kass et al. | |
| 5,516,138 A | 5/1996 | Fontaine | |
| 5,641,174 A | 6/1997 | Terry et al. | |
| 5,868,533 A * | 2/1999 | Fiala .......................... 408/226 |
| 5,915,482 A * | 6/1999 | Carruthers ................... 172/375 |
| 5,988,666 A | 11/1999 | Flater | |
| 6,095,544 A | 8/2000 | Flater | |
| 6,126,359 A * | 10/2000 | Dittrich et al. .............. 403/349 |
| 6,170,850 B1 * | 1/2001 | Works ......................... 280/433 |

* cited by examiner

*Primary Examiner*—Lesley D. Morris
*Assistant Examiner*—Marlon Arce-Diaz

(57) ABSTRACT

A latch mechanism for a fifth wheel hitch that automatically closes a jaw and locks the hitch when the hitch engages a kingpin. The latch mechanism includes a handle that is used set the latch for receiving the kingpin. The latch mechanism also includes a latching member that is biased toward a closed position and tripped in response to engagement of the kingpin with a jaw.

23 Claims, 4 Drawing Sheets

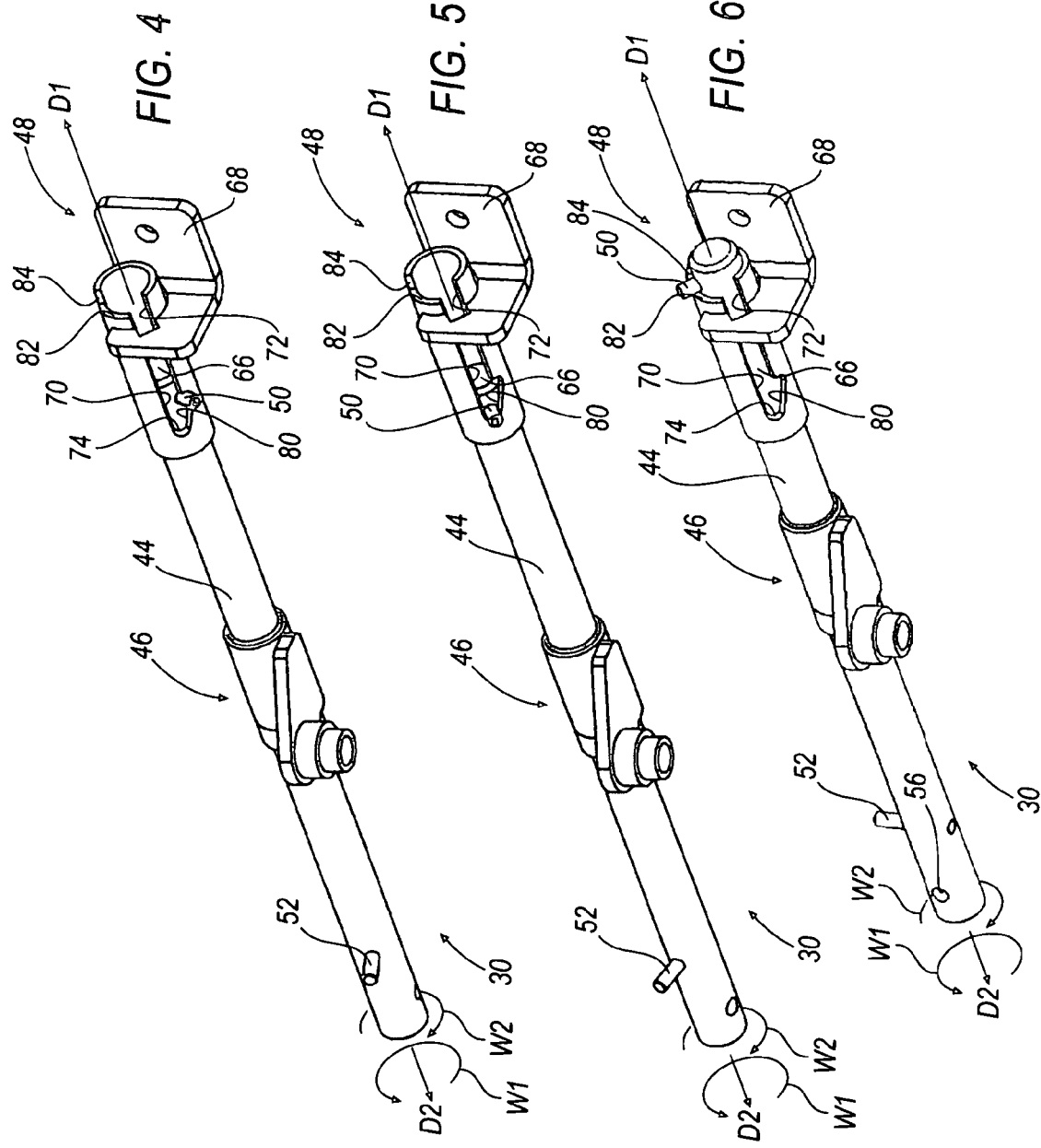

SLIDING LATCH FOR FIFTH WHEEL HITCH

TECHNICAL FIELD

The present invention relates to latching mechanisms for a fifth wheel hitch, and more specifically to an automatically locking biased counterweight-handle latch mechanism.

BACKGROUND OF THE INVENTION

Fifth wheel hitches for towing a trailer behind a towing vehicle are well known in the art. Typically, fifth wheel hitches include a support frame for mounting the hitch to the towing vehicle. Usually, fifth wheel hitches are mounted within the bed of a pick-up truck, but can be mounted in any traction vehicle. The support frame includes a pair of transverse rails that are bolted to the bed and/or frame of the truck, rail assemblies that are releasably mounted to the transverse rails and upright assemblies mounted to the rail assemblies. A transverse cross bar typically interconnects the upright assemblies, thereby forming a head support for mounting a head assembly by means of a trunnion arrangement allowing for pivotal fore and aft movement. The head assembly includes a jaw assembly operable by means of a control handle and is specifically adapted to releasably engage and hold a kingpin of a towed vehicle.

One disadvantage of prior art fifth wheel hitches is that an operator must exit the vehicle to manually actuate the control handle in order to close and/or lock the hitch on the kingpin. Many hitches do not provide an indication to the operator within the vehicle when the hitch is closed and locked on the kingpin.

What is needed, therefore, is a fifth wheel hitch that can automatically close and lock on a kingpin. A hitch that provides an indication to an operator when the hitch is locked would assist the operator in properly using the hitch.

SUMMARY OF THE INVENTION

The present invention relates to a latching mechanism for a fifth wheel hitch that uses a spring to bias a jaw toward a closed position and a counterweight handle that facilitates automatic closure of the hitch and provides indication thereof when a kingpin of a traction vehicle is positioned within the hitch. An embodiment of the fifth wheel hitch includes a hitch mechanism having a jaw that can be closed around a kingpin. The fifth wheel hitch also includes a latching mechanism coupled to the jaw for locking the jaw within the hitch mechanism. The latching mechanism includes a collar having a longitudinal groove formed therein, a shaft interposed within the collar, where the shaft couples the fifth wheel hitch to a handle, and a latching pin coupled to the shaft and selectively guided within the groove. The latching pin and the groove cooperate to restrict rotation of the shaft.

Another embodiment of the present invention provides an automatic latching mechanism for a fifth wheel hitch. The latching mechanism includes a collar having a longitudinal groove formed therein and a shaft interposed within the collar. The shaft couples the fifth wheel hitch to a handle. A latching pin coupled to the shaft is guided within the groove. The latching pin and the groove cooperate to restrict rotation of the shaft.

A further embodiment provides a latching mechanism for a fifth wheel hitch that includes a first member and a second member. The second member is defined by a guiding surface, and the second member is in selective engagement with the first member. One of the members is moveable between a closed position and an open position, and one of the members is coupled to a jaw of the fifth wheel hitch. The latching mechanism also includes a latching member coupled to the first member and selectively guided along the guiding surface, where the latching member and the guiding surface cooperate to restrict movement between the closed position and the open position.

BRIEF DESCRIPTION OF THE DRAWINGS

The present invention will now be described, by way of example, with reference to the accompanying drawings, in which:

FIG. 4 is a perspective view of the latching mechanism of FIG. 3, taken from a different perspective as FIG. 3, and illustrating the mechanism in a set position.

FIG. 5 is a perspective view similar to FIG. 4, with the latching mechanism illustrated in an open, tripped position.

FIG. 6 is a perspective view similar to FIG. 4, with the latching mechanism illustrated in a closed, locked position.

DESCRIPTION OF THE PREFERRED EMBODIMENT

Figure 1:
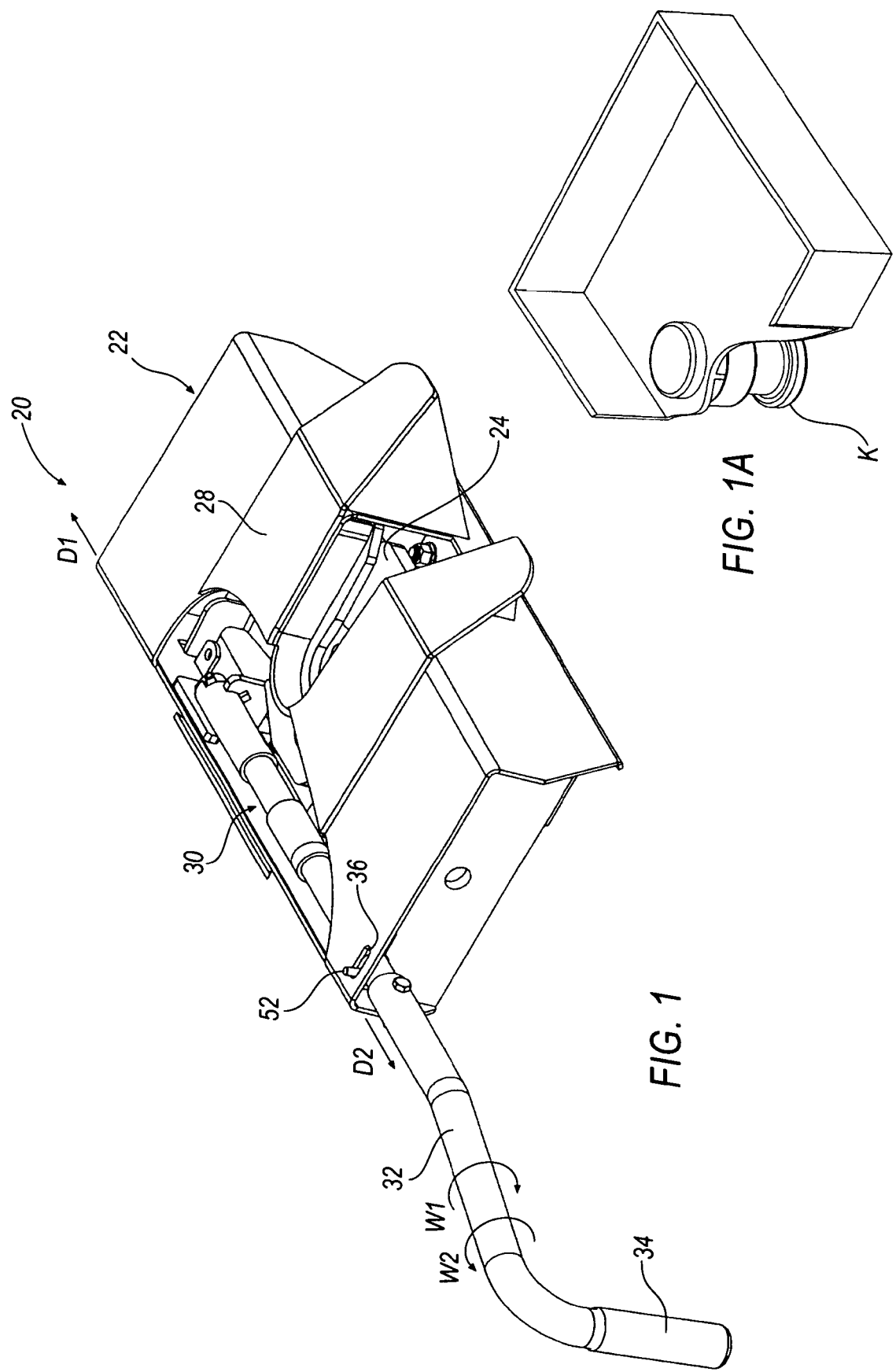
FIG. 1 is a perspective view of a fifth wheel hitch.
Figure 2:
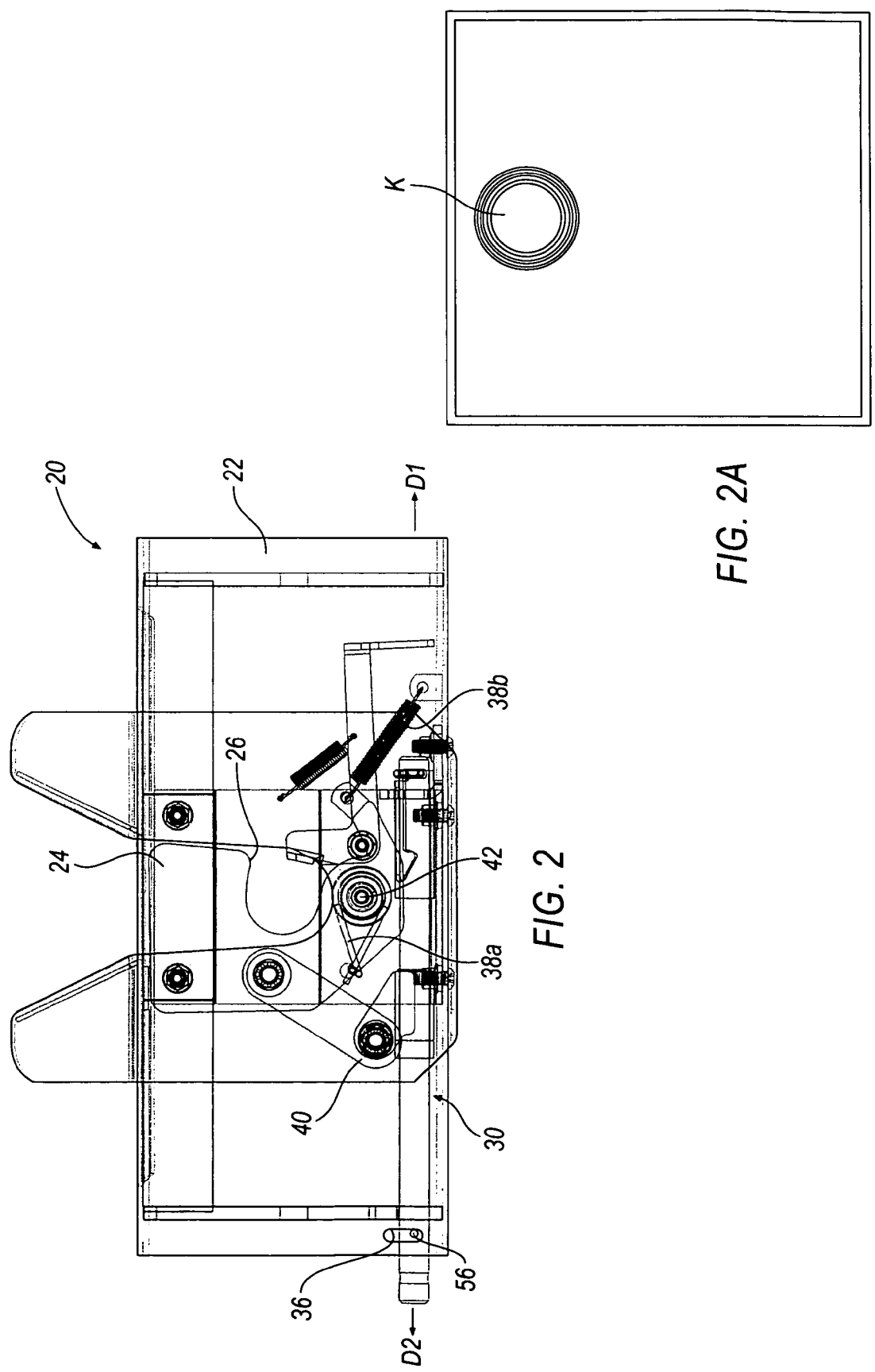
FIG. 2 is a bottom view of the fifth wheel hitch of FIG. 1, illustrating a jaw in a hitch closed position with many phantom components in solid lines.

FIGS. 1 and 2 illustrate a fifth wheel hitch 20. Hitch 20 includes a frame 22 that supports a pivoting jaw 24 having a kingpin engaging surface 26, a support surface 28, and a latching mechanism 30. Latching mechanism 30 is attached to a handle 32 having an offset weight 34 for imparting a torque on latching mechanism 30, as discussed below. Frame 22 is illustrated with a slot 36 formed therein. Two springs 38*a* and 38*b* (FIG. 2 only) bias jaw 24 toward a hitch closed position illustrated in FIGS. 1 and 2. A moveable actuation attachment 40 is coupled to latching mechanism 30 and jaw 24 to permit pivoting of jaw 24 about a jaw pin 42, and thus opening and closing of hitch 20, as discussed in greater detail below. At least a portion of latching mechanism 30 is moveable in a first direction D1, and a second direction D2, as also discussed below. FIGS. 1 and 2 also illustrate a kingpin K in proximity to fifth wheel hitch 20.

Figure 3:
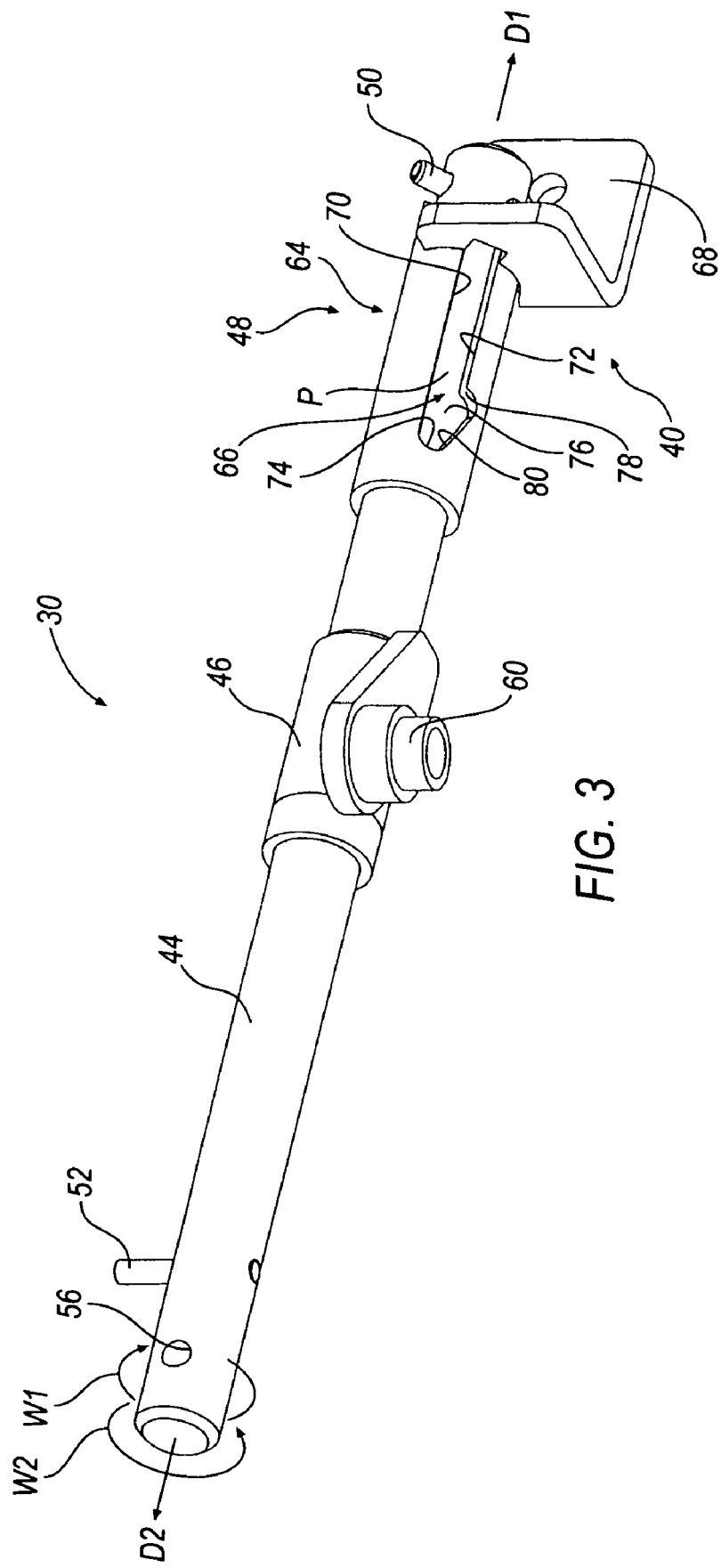
FIG. 3 is a perspective view of a latching mechanism removed from the fifth wheel hitch of FIG. 1.

FIG. 3 illustrates the latching mechanism 30 to include a first member, or shaft, 44, a latching attachment 46, and a collar assembly 48. Shaft 44 includes a latching member, or latching pin 50 extending therefrom, a locking pin 52 extending therefrom, and a handle attachment 56. Handle 32 is coupled to shaft 44 for rotation and translation therewith by handle attachment 56. Shaft 44 is moveable in the first direction D1, the second direction D2, a first angular direction W1, and a second angular direction W2, within the limits of collar assembly 48, as described herein. Latching attachment 46 is rotatably coupled to shaft 44 in such a manner as to limit relative axial movement therebetween. Latching attachment 46 includes an arm 60 coupled to actuation attachment 40. Thus, pivoting of jaw 24 between a hitch open position and a hitch closed position corresponds to movement of shaft 44 in the first and second directions D1, D2.

Collar assembly 48 includes a second member, or collar, 64, having a guiding surface, or groove, 66 formed therein, and a collar bracket 68 for securement of collar 64 to frame 22. Groove 66 includes a longitudinal portion P defined by a upper surface 70, a lower surface 72, an end surface 74 which intersects upper surface 70, a notch portion 76 (shown as generally triangular in the illustrated embodiment) defining an arcuate surface 78 which intersects lower surface 72, and an angled surface 80 which connects arcuate surface 78 with upper surface 70. The arcuate surface 78 is generally normal to the first direction D1.

As best seen in FIGS. 4–6, the groove 66 further includes a latching surface 82, which intersects upper surface 70, and a stop surface 84 which intersects latching surface 82. Latching surface 82 is generally normal to first direction D1, and stop surface 84 is generally parallel to first direction D1. Collectively, surfaces 70, 72, 74, 78, 80, 82, and 84 act as guide surfaces for directing and limiting movement of latching pin 50. As springs 38*a*, 38*b* (FIG. 2 only) bias jaw 24 toward a closed position, shaft 44 is positively biased in the first direction D1 through the connection of arm 60 and actuation attachment 40. Thus, springs 38*a*, 38*b* exert a continuous force on shaft 44 in the first direction.

The operation of latching mechanism 30 will now be described. With specific reference to FIGS. 4–6, latching pin 50 is guidable within groove 66 between a latch open position (FIG. 5), where latching pin 50 contacts end surface 74, and a latch closed, locked position (FIG. 6), where latching pin 50 contacts stop surface 84. FIG. 4 illustrates a set position for latching mechanism 30 where latching pin 50 bindingly contacts arcuate surface 78. This binding contact is a result of the biasing force of springs 38*a*, 38*b* acting on shaft 44 in the first direction D1. With latching pin 50 in contact with arcuate surface 78, movement of shaft 44 in the first direction is restricted, and the force exerted by springs 38*a*, 38*b* on shaft 44 is arrested. The set position of FIG. 4 corresponds to a set position of hitch 20 where jaw 24 is between the hitch closed position and the hitch open position. In the set position, the kingpin K of a towed vehicle (not shown) is received into hitch 20 and will interfere with jaw 24 and urge jaw 24 toward the hitch open position as the kingpin engaging surface 26 of jaw 24 follows a surface portion of the kingpin K.

As the kingpin K is further received into hitch 20, jaw 24 will move toward the hitch open position, as described above, thus moving latching mechanism 30 from the set position (FIG. 4) to the latch open position (FIG. 5), which results in shaft 44 moving in the second direction D2. This movement of shaft 44 in the second direction D2 urges shaft 44 to rotate in the second angular direction W2 as latching pin 50 is guided by angled surface 80. Additionally, the offset weight 34 of handle 32 creates a torque that urges shaft 44 in the second angular direction W2, thereby urging latching pin 50 toward upper surface 70. As the kingpin K is received further within hitch 20, the jaw 24, being biased by springs 38*a*, 38*b*, will move toward the hitch closed position, thus moving shaft 44 in the first direction D1. As shaft 44 moves in the first direction D1, latching pin 50, which is continually urged toward upper surface 70 by the weight of handle 32, is guided by upper surface 70 as latching mechanism 30 moves from a latch open position (FIG. 5) to a latch closed position.

As latching pin 50 is guided beyond upper surface 70 to latching surface 82, shaft 44 is rotated in angular direction W2 by the torque provided by offset weight 34 of handle 32 until latching pin 50 contacts stop surface 84 (FIGS. 1, 2 and 6). In this latch locked, closed position, shaft 44 is arrested, or restrained, from moving in the second direction D2 by the binding engagement between latching pin 50 and latching surface 82. As best seen in FIG. 1, locking pin 52 engages the slot 36 to further inhibit shaft 44 from moving in the second direction D2, and handle 32 is desirably in a downward position. Thus provided, hitch 20 is in the hitch locked, closed position, as jaw 24 is restrained about the kingpin K. In this manner, an operator may view the position of handle 32 to confirm whether the hitch 20 is in the hitch locked closed position, thereby confirming that the towed vehicle is properly attached to the traction vehicle.

To unlock hitch 20, an operator must rotate handle 32 in the first angular direction W1 until latching pin 50 passes beyond latching surface 82, thus disengaging locking pin 52 from the slot 36 and placing hitch 20 in a hitch closed, unlocked position. Handle 32 may then be pulled in the second direction D2, against the biasing force of spring 38, to move jaw 24, thus moving hitch 20 from the hitch closed, unlocked position to the hitch open position. After latching pin 50 passes beyond lower surface 72, handle 32 is further rotated in the first angular direction W1, counteracting the torque provided by offset weight 34 of handle 32 that is offset from the axis of shaft 44. Handle 32 is permitted to translate in the first direction D1 as latching pin 50 contacts arcuate surface 78 and angled surface 80, thereby returning latching mechanism 30 to the set position of FIG. 4. When the operator releases the handle 32, the biasing force of spring 38 acting to force latching pin 50 into binding contact with arcuate surface 78 creates sufficient friction that is not overcome by the counteracting torque exerted by offset weight 34 of handle 32 that acts to urge shaft 44 to rotate in the second angular direction W2.

While the invention has been described with respect to specific examples including preferred modes of carrying out the invention, those skilled in the art will appreciate that there are numerous variations and permutations of the above described system and techniques that fall within the spirit and scope of the invention as set fourth in the appended claims.

What is claimed is:

1. An automatic latching mechanism for a fifth wheel hitch, comprising:
  a collar having a longitudinal groove formed therein;
  a shaft interposed within said collar and moveable between a closed position and an open position, wherein said shaft couples the fifth wheel hitch to a handle; and
  a latching pin coupled to said shaft and selectively guided within said groove, wherein said latching pin and said groove cooperate to restrict rotation of said shaft.

2. The mechanism of claim 1, wherein said latching pin and said groove cooperate to restrict relative axial movement between said collar and said shaft.

3. The mechanism of claim 1, further comprising a locking pin coupled to said shaft, wherein said locking pin cooperates with a slot to restrict relative axial movement between said collar and said shaft.

4. The mechanism of claim 1, further comprising a spring, wherein said spring selectively biases said shaft in a first axial direction.

5. The mechanism of claim 1, further comprising a handle, wherein said handle provides an offset weight that selectively biases said shaft in a first angular direction.

6. The mechanism of claim 5, further comprising a spring, wherein said spring selectively biases said shaft in a first axial direction, and wherein said groove includes an arcuate notch, and wherein said latching pin is selectively guided within said arcuate notch to permit limited rotation of said shaft relative to said collar.

7. The mechanism of claim 6, wherein said arcuate notch includes a set surface, said latching pin is selectively biased in binding contact with said set surface to restrict rotation of said shaft relative to said collar in a second angular direction.

8. The mechanism of claim 7, wherein said handle selectively biases said shaft in a first angular direction, such that said binding contact prevents said rotation of said shaft relative said collar in a second angular direction.

9. A fifth wheel hitch, comprising:
a hitch mechanism having a jaw moveable between a first position and a second position, wherein said jaw selectively couples with a kingpin;
a latching mechanism coupled to said jaw for locking said kingpin within said hitch mechanism including:
a collar coupled to said frame and having a longitudinal groove formed therein;
a shaft interposed within said collar and moveable between a closed position and an open position, wherein said shaft couples the fifth wheel hitch to a handle; and
a latching pin coupled to said shaft and selectively guided within said groove, wherein said latching pin and said groove cooperate to restrict rotation of said shaft.

10. The fifth wheel hitch of claim 9, wherein said latching pin and said groove cooperate to restrict relative axial movement between said collar and said shaft.

11. The fifth wheel hitch of claim 9, further comprising a locking pin coupled to said shaft, wherein said locking pin cooperates with a slot to restrict relative axial movement between said frame and said shaft, thereby defining a locked position.

12. The fifth wheel hitch of claim 9, further comprising a spring, wherein said spring selectively biases said shaft in a first axial direction, and wherein said groove includes an arcuate notch, and wherein said latching pin is selectively guided within said arcuate notch to permit limited rotation of said shaft relative to said collar.

13. The fifth wheel hitch of claim 12, wherein said arcuate notch includes a set surface, said latching pin is selectively biased in binding contact with said set surface to restrict rotation of said shaft relative to said collar in a second angular direction.

14. The fifth wheel hitch of claim 13, further comprising a handle with an offset weight, wherein said handle selectively biases said shaft in said second angular direction.

15. The fifth wheel hitch of claim 14, wherein the kingpin selectively translates said shaft in a second direction such that said binding contact is reduced sufficiently to permit rotation of said shaft in said second angular direction.

16. The fifth wheel hitch of claim 15, wherein said handle selectively urges said shaft in said second angular direction.

17. The fifth wheel hitch of claim 9, further comprising a handle, wherein said handle provides an indication when said latching mechanism is in a locked position.

18. An automatic latching mechanism for a fifth wheel hitch, comprising:
a first member;
a second member defining a guiding surface, wherein said second member is in selective engagement with said first member, one of said first member and said second member is moveable between a closed position and an open position, and wherein one of said first member and said second member is coupled to a jaw of the fifth wheel hitch;
a latching member coupled to said first member and selectively guided adjacent said guiding surface, wherein said latching member and said guiding surface cooperate to restrict movement between said closed position and said open position; and
a handle, wherein said handle provides an indication when the latching mechanism is in a locked position.

19. The mechanism of claim 18, wherein said latching member and said guiding surface cooperate to allow at least a portion of the latching mechanism to move between a locked position and an unlocked position.

20. The mechanism of claim 1, further comprising a latching attachment coupled to the shaft and the hitch, wherein the latching attachment will rotate relative to the shaft.

21. The mechanism of claim 3, wherein the locking pin rotates into engagement with the slot as the shaft rotates relative to the hitch.

22. The mechanism of claim 1, wherein the groove includes an angled surface, and the latching pin selectively guides along the angled surface as the shaft is moved axially within the collar to rotate the shaft relative to the collar.

23. The fifth wheel hitch of claim 9, wherein the groove includes an angled surface, and the latching pin selectively guides along the angled surface as the shaft is moved axially within the collar to rotate the shaft relative to the collar.

* * * * *